United States Patent
Urano et al.

(10) Patent No.: US 11,577,743 B2
(45) Date of Patent: Feb. 14, 2023

(54) SYSTEMS AND METHODS FOR TESTING OF DRIVER INPUTS TO IMPROVE AUTOMATED DRIVING

(71) Applicant: Toyota Research Institute, Inc., Los Altos, CA (US)

(72) Inventors: Hiromitsu Urano, Numazu (JP); Kentaro Ichikawa, Sunto-gun (JP); Junya Ueno, Susono (JP)

(73) Assignee: Toyota Research Institute, Inc., Los Altos, CA (US)

( * ) Notice: Subject to any disclaimer, the term of this patent is extended or adjusted under 35 U.S.C. 154(b) by 4 days.

(21) Appl. No.: 16/924,710

(22) Filed: Jul. 9, 2020

(65) Prior Publication Data
US 2022/0009512 A1  Jan. 13, 2022

(51) Int. Cl.
*B60W 50/10* (2012.01)
*B60W 50/08* (2020.01)
*B60W 40/09* (2012.01)
*B60W 50/00* (2006.01)

(52) U.S. Cl.
CPC ............ *B60W 50/10* (2013.01); *B60W 40/09* (2013.01); *B60W 50/085* (2013.01); *B60W 2050/0073* (2013.01); *B60W 2540/30* (2013.01)

(58) Field of Classification Search
CPC .................................................. B60W 50/085
See application file for complete search history.

(56) References Cited

U.S. PATENT DOCUMENTS

| | | | |
|---|---|---|---|
| 9,159,235 B2 | 10/2015 | Hegemann et al. | |
| 9,349,044 B2 | 5/2016 | Joo et al. | |
| 9,703,475 B2 | 7/2017 | Shinozaki | |
| 10,259,471 B2 | 4/2019 | Sato et al. | |
| 10,471,956 B2 | 11/2019 | Kim et al. | |
| 2008/0258884 A1* | 10/2008 | Schmitz | G01S 13/931 340/425.5 |
| 2012/0191267 A1 | 7/2012 | Ogawa et al. | |
| 2017/0061826 A1 | 3/2017 | Jain et al. | |
| 2017/0305453 A1 | 10/2017 | Nishio et al. | |
| 2018/0067486 A1 | 3/2018 | Yako et al. | |
| 2018/0178808 A1* | 6/2018 | Zhao | B60K 28/066 |
| 2019/0071100 A1 | 3/2019 | Xavier | |
| 2020/0139992 A1* | 5/2020 | Oba | G08G 1/16 |
| 2020/0180611 A1* | 6/2020 | Klingemann | B60W 50/14 |
| 2020/0211354 A1* | 7/2020 | Kapuria | G06V 40/19 |

* cited by examiner

*Primary Examiner* — Imran K Mustafa
(74) *Attorney, Agent, or Firm* — Christopher G. Darrow; Darrow Mustafa PC

(57) ABSTRACT

System, methods, and other embodiments described herein relate to improving automated driving by testing for inputs during driving. In one embodiment, a method includes testing an input from a driver in a manual driving mode of a vehicle. The method also includes adapting a fixed time interval on a condition that a test result of the input satisfies criteria used to validate driver inputs. The method also includes monitoring, via an input system of the vehicle, for driver feedback according to the fixed time interval in an automated driving mode.

20 Claims, 5 Drawing Sheets

SYSTEMS AND METHODS FOR TESTING OF DRIVER INPUTS TO IMPROVE AUTOMATED DRIVING

TECHNICAL FIELD

The subject matter described herein relates, in general, to improving vehicle operation, and, more particularly, testing driver inputs during driving to improve automated driving system (ADS) operation.

BACKGROUND

Vehicles may be equipped with automated driving modules for autonomous driving as part of an automated driving system (ADS). An ADS of a vehicle may adapt to driving habits, driving behavior, the experience level of a driver, driver attention, or the like. The ADS adapting to a driver may improve the operation in certain ADS modes that sometimes may use driver feedback. Concerning driver behavior, a driver accustomed to level 1 or 2 automated driving may operate a vehicle differently than in higher-level modes of automated driving. Also, driver behavior may change after becoming too comfortable with a vehicle that provides automated or autonomous driving controls.

In various approaches, an ADS of a vehicle may learn about driver behavior in a special driving facility, a virtual training system, using special vehicle equipment, or the like. An ADS learning through these methods can be time-intensive, inconvenient, or ineffective for drivers of various experience levels. Thus, training an ADS about driver behavior may be difficult outside of the actual driving environment.

Furthermore, a vehicle system may use driver inputs within fixed time periods for the proper operation of certain ADS modes. A driver input may be touching the steering wheel, contact with the brake pedal, contact with the accelerator pedal, or the like. For example, a lane-keep assist (LKA) system may use a driver touch of a steering wheel to maintain the proper operation or engagement. The LKA system may reset a timer when a driver provides expected feedback by touching a steering wheel. The LKA system may otherwise generate a warning or notification if the timer expires before receiving a needed driver input. In addition, the vehicle system may need to determine a valid driver input from an accidental input for LKA mode, ADS mode, or the like. The LKA system may unnecessarily respond or disengage if a driver input is detected as erroneous during operation. Detecting valid driver inputs can vary according to driving habits, driving behavior, the experience level of a driver, driver attention, or the like. Current solutions for a vehicle system testing for valid driver inputs may be ineffective at adapting LKA and other ADS systems.

SUMMARY

In one embodiment, example systems and methods relate to a manner of improving automated driving using a testing system that tests for driver inputs. Certain automated driving system (ADS) modes may use driver inputs and interaction for the proper operation. As one example, if a valid driver input is not received before the expiration of a timer, an ADS system may generate a warning. However, behaviors of drivers may vary, thereby frustrating the functioning of these systems. In various implementations, current solutions for an ADS learning to adequately adapt to driver behavior may be time-intensive, inconvenient, or ineffective for drivers of various experience levels. Therefore, an improved approach for ADS operation is disclosed where a testing system tests for valid driver inputs used during various circumstances, such as manual driving maneuvers, or the like. The testing system increases the fixed time interval when testing indicates a valid driver input. In one approach, the increased fixed time interval is used by the ADS for feedback operation. The testing system may use the increased fixed time interval as the frequency for additional testing. In this way, a system distinguishes valid driver inputs from erroneous driver inputs using a precise fixed time interval adapted for the driver.

In one embodiment, a testing system for improving automated driving by testing for driver inputs during driving is disclosed. The testing system includes one or more processors and a memory communicably coupled to the one or more processors. The memory stores a testing module including instructions that when executed by the one or more processors cause the one or more processors to test an input from a driver in manual driving mode of a vehicle. The memory also stores an adaptation module including instructions that when executed by the one or more processors cause the one or more processors to adapt a fixed time interval on a condition that a test result of the input satisfies criteria used to validate driver inputs. The memory also stores an automated driving system module including instructions that when executed by the one or more processors cause the one or more processors to monitor, via an input system of the vehicle, for driver feedback according to the fixed time interval in an automated driving mode.

In one embodiment, a non-transitory computer-readable medium for improving automated driving by testing for driver inputs during driving and including instructions that when executed by one or more processors cause the one or more processors to perform one or more functions is disclosed. The instructions include instructions to test an input from a driver in manual driving mode of a vehicle. The instructions also include instructions to adapt a fixed time interval on a condition that a test result of the input satisfies criteria used to validate driver inputs. The instructions also include instructions to monitor, via an input system of the vehicle, for driver feedback according to the fixed time interval in an automated driving mode.

In one embodiment, a method for improving automated driving by testing for driver inputs during driving is disclosed. In one embodiment, the method includes testing an input from a driver in a manual driving mode of a vehicle. The method also includes adapting a fixed time interval on a condition that a test result of the input satisfies criteria used to validate driver inputs. The method also includes monitoring, via an input system of the vehicle, for driver feedback according to the fixed time interval in an automated driving mode.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented

DETAILED DESCRIPTION

Systems, methods, and other embodiments associated with improving automated driving using a testing system that tests for valid driver inputs are disclosed herein. In one embodiment, a testing system may test driver input validity during manual driving to adapt a fixed time interval. The fixed time interval may be associated with a period that certain automated driving system (ADS) modes use to determine valid driver feedback and interaction before generating a warning. These ADS modes may use driver interaction, engagement, attention, or the like to perform automated driving operations. The testing system may determine that the driver input is valid according to various tests. For example, a test may validate a driver input by determining whether various vehicle controls/maneuvers executed by the driver, such as handling, centering, acceleration, braking, or the like satisfy criteria. According to an assessment of the criteria, the testing system may adapt or adjust the fixed time interval. The adapted fixed time interval may cause an increase or decrease in the frequency of driver feedback used by an ADS mode to adjust driver reaction times. In this way, ADS modes may operate more effectively by testing and adapting driver interaction levels according to driving habits, driving behavior, driving styles, vehicle handling, the experience level of a driver, driver attention, driver awareness, or the like.

Moreover, a testing system uses the adjusted time interval to schedule subsequent testing. Further testing may adapt the fixed time interval according to changing driver behavior, driving conditions, location, or the like. In this way, the ADS mode using the fixed time interval may continuously adapt to improve the reliability, effectiveness, and responsiveness of automated driving. The testing system may further improve driver satisfaction and enjoyment by avoiding erroneous warnings from inaccurate fixed time intervals during automated driving.

Figure 1:
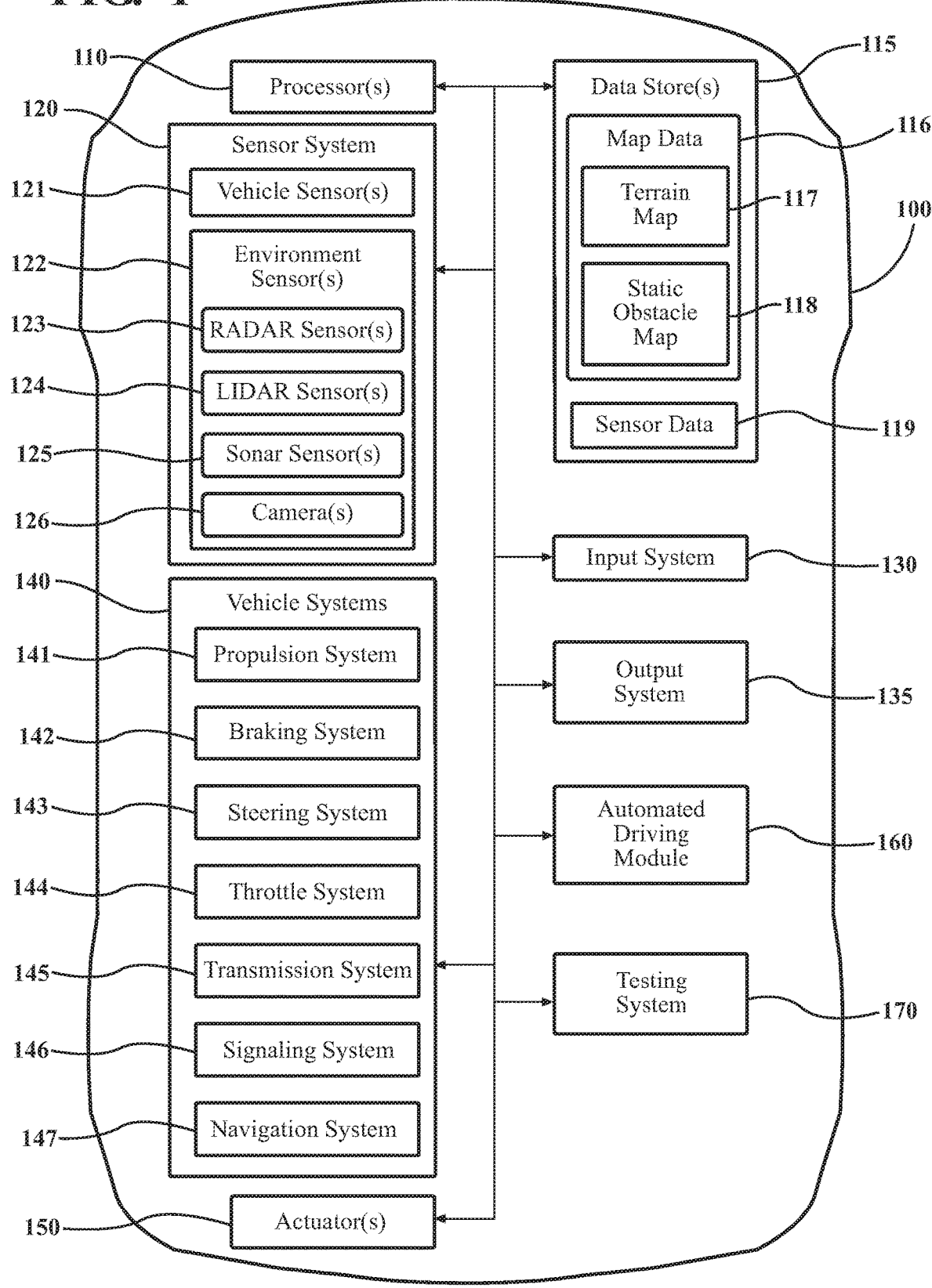
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects to operate in ADS mode. As further described herein, an ADS may comprise the automated driving module (ADM) 160, the parts of sensor system 120, the parts of vehicle systems 140, the actuators 150, and the data store(s) 115 that operate together to autonomously drive and control the vehicle 100 in ADS mode. The vehicle 100 may use a testing system that tests for valid driver inputs to adapt a fixed time interval. The fixed time interval may be used during various circumstances in ADS mode, such as manual driving maneuvers, that may need driver interaction.

The vehicle 100 also includes various elements. It will be understood that in various embodiments, the vehicle 100 having all of the elements shown in FIG. 1 may be unnecessary. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 uses an improved testing system that tests for valid driver inputs to adapt a fixed time interval. The vehicle 100 may use the fixed time interval during various circumstances in ADS mode, such as manual driving maneuvers.

Figure 2:
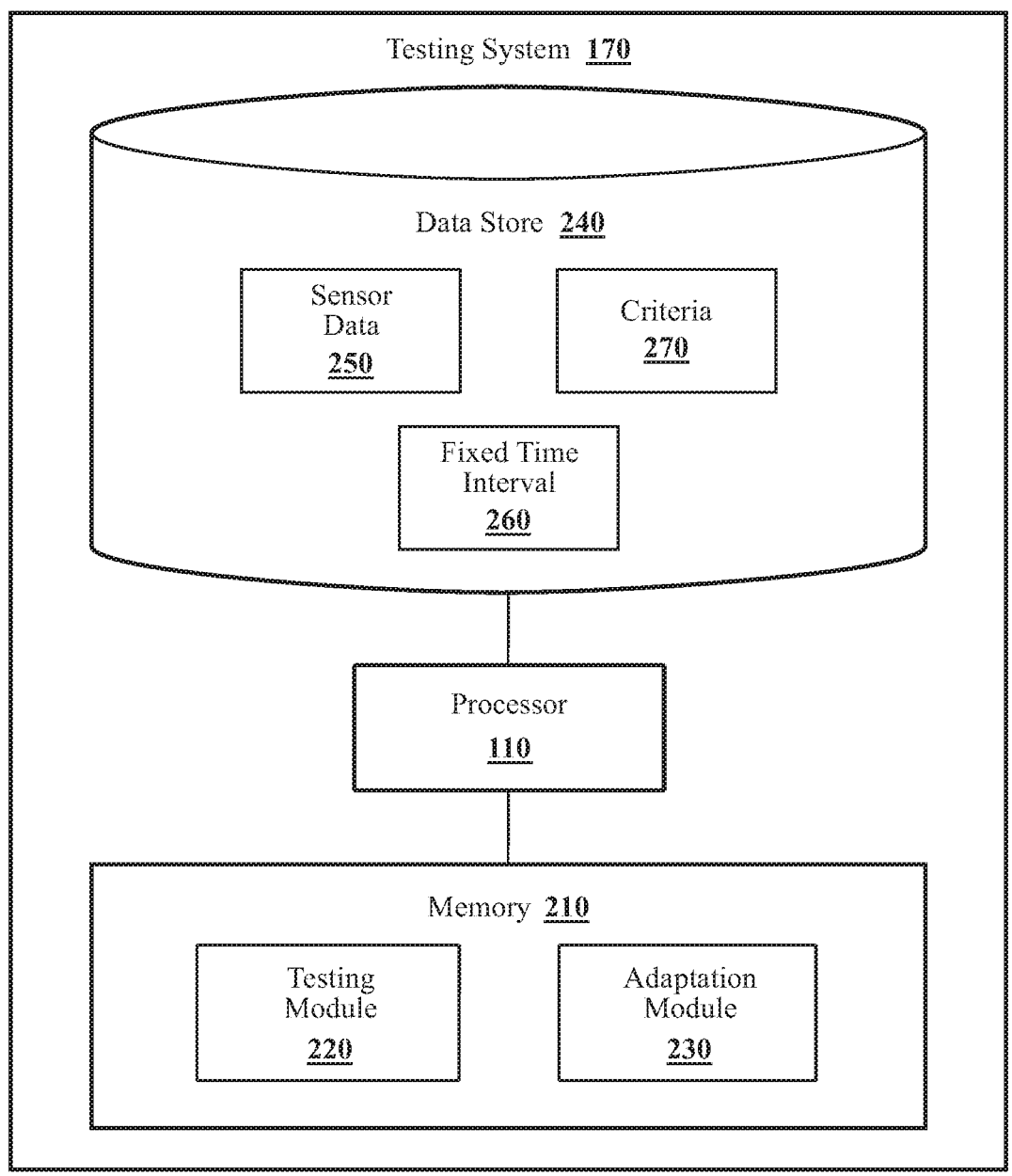
FIG. 2 illustrates one embodiment of a testing system to test for valid driver inputs in manual driving mode and adapts a fixed time interval.

FIG. 2 illustrates one embodiment of a testing system that is associated with a test that determines valid driver inputs in a manual driving mode and adapts a fixed time interval associated with the vehicle in FIG. 1. The testing system 170 is shown as including a processor 110 from the vehicle 100 of FIG. 1. Accordingly, the processor 110 may be a part of the testing system 170, the testing system 170 may include a separate processor from the processor 110 of the vehicle 100, or the testing system 170 may access the processor 110 through a data bus or another communication path. In one embodiment, the testing system 170 includes a memory 210 that stores a testing module 220 and an adaptation module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

The testing system 170 as illustrated in FIG. 2 is generally an abstracted form that includes the testing module 220 and the adaptation module 230. The testing module 220 and the adaptation module 230 may generally include instructions that function to control the processor 110 to receive data inputs from one or more vehicle systems or sensors of the vehicle 100. The modules 220 and 230, in one approach, may use the received data inputs to adapt the fixed time interval 260 during the manual driving mode. The testing module 220, in one embodiment, may control the respective sensors (e.g., inertial measurement unit (IMU), input sensors, etc.) to provide the data inputs in the form of the sensor data 250. Moreover, in one approach, the sensor data 250 may include some or all of the vehicle data from the sensor data 119. The testing system 170 and the testing module 220 may use the sensor data 250 to determine if an input is valid during the manual driving mode. For example, the testing system 170 may determine a driver input is valid from the sensor data 250 indicating that the vehicle 100 is maintaining a center position by, in one approach, staying within a certain distance from side lane markers of a driving lane.

Additionally, the testing module 220 may acquire the sensor data 250 actively or passively. For example, the testing module 220 can passively sniff the sensor data 250 from a stream of electronic information provided by the various sensors to further components within the vehicle 100. Accordingly, the testing system 170 can undertake various approaches to fuse data from multiple sensors when providing the sensor data 250 and/or from sensor data acquired over a wireless communication link. Thus, the sensor data 250, in one embodiment, represents a combination of perceptions acquired from multiple sensors.

In general, the sensor data 250 includes at least the vehicle control inputs. The vehicle control inputs comprise, in one example, steering inputs (e.g., steering wheel angle, rate and direction of rotation, etc.), braking inputs (e.g., the extent of brake pedal activation/pressure), and acceleration inputs (e.g., the extent of accelerator pedal activation/pressure). In further aspects, the vehicle control inputs also specify transmission control inputs (e.g., gear selection), drive mode (e.g., 2-wheel drive, 4-wheel drive, etc.), engine/motor parameters (e.g., engine RPM, driving mode for hybrid vehicles, etc.), and so on. In yet further aspects, the sensor data 250 includes current dynamics data such as angular velocity, g-forces (e.g., longitudinal, lateral, etc.), speed profile, wheel speeds, activation controls (e.g., anti-lock brake system (ABS) activation, traction control activation, stability control activation, etc.), and so on.

As one example, according to a particular implementation, the vehicle 100 may include different versions of an IMU sensor that are separately capable of different measurements. That is, in one implementation, the IMU sensor may provide yaw rate, lateral acceleration, and longitudinal acceleration, whereas, in a separate implementation with a more robust IMU sensor, the IMU sensor may provide additional data such as pitch rates, roll rates, vertical acceleration, etc. As such, the testing system 170 may, in one or more approaches, be configured to adapt to different electronic inputs depending on the availability of such information. As an additional note, telematics data as used herein generally encompasses the sensor data 250 and may include further information such as vehicle identifiers, location information (e.g., GPS position), and other information that may be used by the testing system 170 to determine travel paths or plans for the vehicle 100 by the automated driving module(s) 160.

Moreover, in one embodiment, the testing system 170 includes a data store 240. In one embodiment, the data store 240 is a database. The database is, in one embodiment, an electronic data structure stored in the memory 210 or another data store and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes the sensor data 250 along with, for example, metadata that characterize various aspects of the sensor data 250.

In one embodiment, the data store 240 also includes the fixed time interval 260 and the criteria 270 parameters. The automated driving module(s) 160 may use an adapted fixed time interval 260 that is adjusted from testing for valid driver inputs during the manual driving mode. The testing system 170 may determine the fixed time interval 260 by identifying whether a vehicle input associated with a driver maneuver satisfies parameters of the criteria 270. In one approach, the testing system 170 may increase the fixed time interval 260 by one or more time units when the criteria 270 are satisfied. For example, the testing system 170 may determine that deceleration of the vehicle 100 at a certain rate by hitting the brakes satisfies parameters of the criteria 270 for validating the driver input. In addition, the testing system 170 may determine that an input is valid if the vehicle 100 maintains a stable speed or distance with another vehicle according to the sensor data 250. The vehicle 100 may use an increased fixed time interval 260 during an ADS mode where steering wheel feedback within the fixed time intervals 260 indicates appropriate responsiveness, attention, alertness, participation, or the like for automated driving. The testing system 170 may repeat the test periodically and adapt the fixed time interval 260 accordingly. In this way, the vehicle 100 has an accurate and reliable value for the fixed time interval 260 to use for driver participation during certain ADS modes.

Continuing with FIG. 2 and the manner in which the testing system 170 implements the driver testing, in one approach, the testing system 170 may use a machine learning algorithm to derive parameters of the criteria 270. The testing system 170 adapts the criteria 270 according to a valid driver input associated with a driver's maneuver, behavior, or the like during manual or automated driving. For example, a convolutional neural network (CNN) may utilize the sensor data 250 to derive the parameters used in assessments for the criteria 270.

In the forthcoming examples, the testing module 220 and the adaptation module 230 of the testing system 170 may utilize the sensor data 250, the fixed time interval 260, and/or the criteria 270 stored in the data store 240 to test for valid driver inputs and accordingly adapt the fixed time interval 260. In particular, the testing module 220 may use, for example, the sensor data 250 to analyze a driver input associated with a maneuver. The adaptation module 230 may subsequently adapt a fixed time interval if a test result of the driver input satisfies the criteria 270 parameters, thereby validating the driver input. For example, the testing system 170 may analyze how the driver handles centering, curves, hills, or the like within an offset or tolerance value associated with the criteria 270. The testing system 170 may validate the driver input by satisfying parameters of the criteria 270 and adapt the fixed time interval 260 when the driver input(s) is within the offset or tolerance value associated with the maneuver. For example, if the driver handles the vehicle 100 within an offset value, the testing system 170 may increase the fixed time interval 260 according to the valid driver input(s). If the driver inputs are jerky and outside 10% of an offset value, for example, the testing system 170 may determine driver maneuvering or attention is unsatisfactory. Accordingly, the fixed time interval 260 may be decreased or initialized. When the testing system 170 determines that driver alertness, awareness, interaction, or the like is minimal, the testing system 170 may, in one approach, initialize the fixed time interval 260 by resetting to a default value for automated driving to use more frequent driver feedback or testing. Thus, the testing system 170 tests and monitors driver inputs for various scenarios to accurately adapt the fixed time interval 260 for more reliable and effective automated driving.

Figure 3:
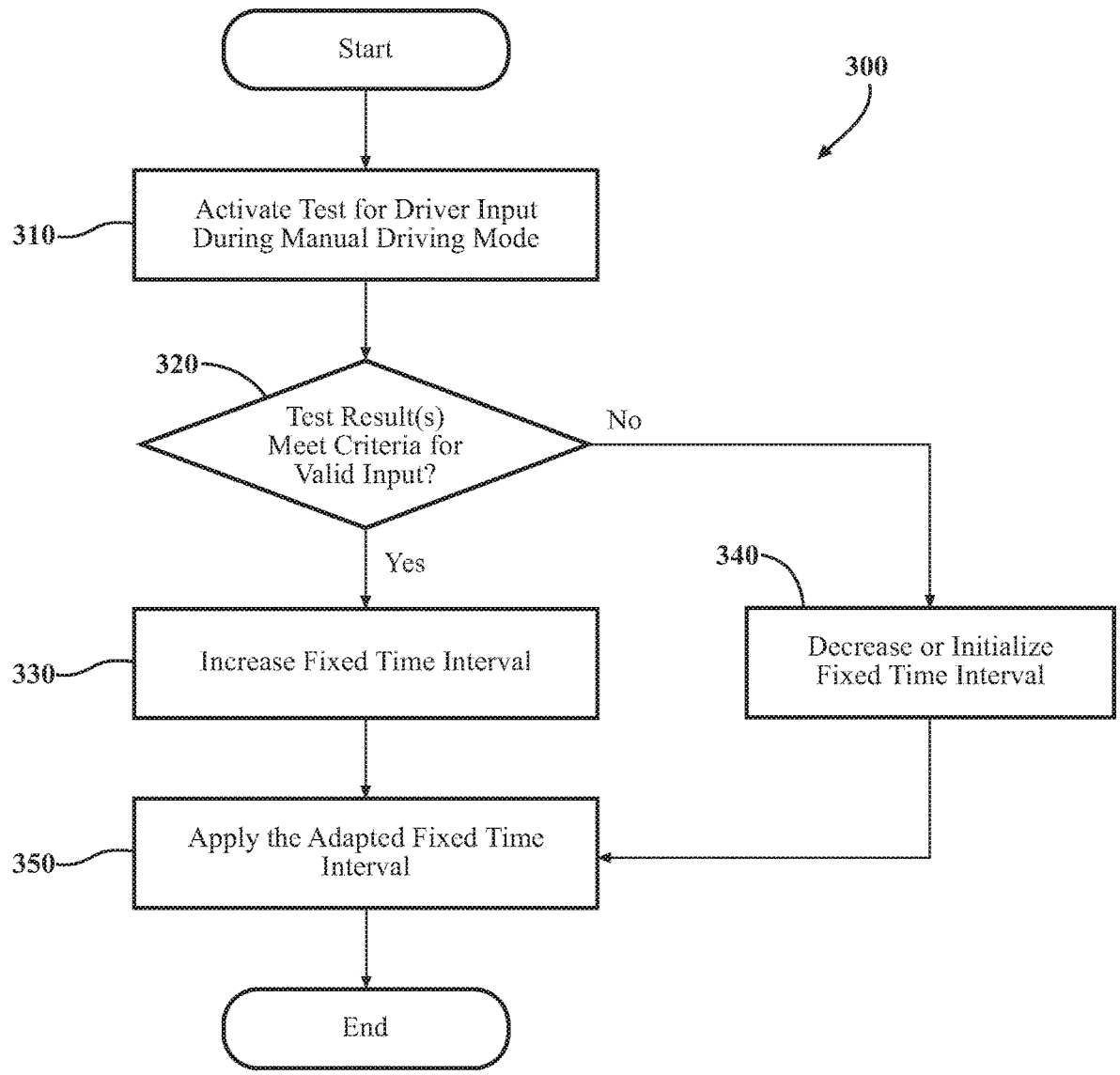
FIG. 3 illustrates one embodiment of a method that is associated with testing for valid driver inputs to adapt a fixed time interval that is used during automated driving.

FIG. 3 illustrates one embodiment of a method that is associated with testing for valid driver inputs to adapt the fixed time interval 260 used during automated driving. Method 300 will be discussed from the perspective of the testing system 170 of FIGS. 1 and 2. While method 300 is discussed in combination with the testing system 170, it should be appreciated that the method 300 is not limited to being implemented within the testing system 170 but is instead one example of a system that may implement the method 300.

As a brief introduction to the method 300, prior to the discussion of the explicitly identified functions, the testing system 170 may determine if a driver input is valid by satisfying parameters of the criteria 270 during the manual driving mode. The fixed time interval 260 is adapted if the criteria 270 are satisfied. The fixed time interval may be associated with a period that certain ADS modes use for valid driver feedback and interaction before generating a warning. A warning may be an alarm, a displayed prompt, haptic feedback, or the like.

In one approach, the criteria 270 may be associated with meeting threshold settings for inputs associated with handling, centering, acceleration, braking, or the like according to the sensor data 250. In another approach, the testing system 170 may use the map data to determine if the criteria 270 are satisfied when a trajectory of vehicle 100 aligns with a travel path. As another approach, the testing system 170 may use information from the input system 130 and the sensor data 250 to determine if parameters of the criteria 270 are satisfied.

As an example, testing module 220 may test inputs from the input system 130 associated with the vehicle 100 maintaining speed or a stable distance with a front vehicle. If one or more input(s) satisfies the criteria 270 for centering or handling according to map data 116, the testing system 170 determines that the driver input is valid and the fixed time interval 260 may be increased. The adapted fixed time interval 260 improves intervals used for driver feedback for certain ADS modes. The testing system 170 may also use the adapted fixed time interval 260 for further testing during the manual driving mode to regularly adjust for different driver behavior and driving conditions.

Referring again to testing a driver input during the manual driving mode in FIG. 3, at 310 the testing module 220 may activate a test. The testing module 220 may activate testing at startup of the vehicle 100, engagement of the ADM 160, disengagement of the ADM 160, or the like. The testing module 220 may also activate upon receiving a driver command to adapt or calibrate the fixed time interval 260. Upon activation, the testing module 220 may begin monitoring driver inputs by logging inputs over a defined period, such as the fixed time interval 260. For example, the testing module 220 may monitor inputs of input system 130 or vehicle control inputs associated with the sensor data 119 or 250 to test for driver interaction during a manual driving mode. In this way, the testing system may assess various vehicle systems to determine testing priorities.

The testing module 220, in certain configurations, may repeat a test for a driver input every ten minutes, every 100 meters (m), after 100 milliseconds (ms), or the like. The periodicity of testing may be associated with the position, location, or the like of the vehicle 100 determined using map data 116. For example, the testing module 220 may test driver inputs more frequently for the vehicle 100 in an area with rapidly changing driving conditions (e.g., mountainous, hilly, curvy, or other similar terrain, etc.) that may require regular calibration of the fixed time interval 260. The output system 135 may generate an indication every time testing commences. For example, the indication may be a prompt on a display, a vibration of the driver's seat, haptic feedback on the steering wheel, or the like.

At 320, the adaptation module 230 may adapt the fixed time interval 260 if the test result(s) of the driver input satisfies the criteria 270. For example, the testing system 170 determines that a driver input satisfies parameters of the criteria 270 and valid according to a driver's behavior. In one approach, during the manual driving mode the testing system 170 may determine that a driver input is valid by satisfying parameters of the criteria 270 when a driver keeps the vehicle 100 from drifting off center by staying within a certain distance from side lane markers of a driving lane.

In another approach, if the testing system 170 detects that trajectory of the vehicle 100 is unstable, vibrating on a road shoulder, or the like the driver input may be invalid. The testing system 170 may determine vehicle 100 stability by comparing an offset between a potential travel path obtained from navigation system 147 to the current travel path. In another approach, the testing system 170 may use data from terrain map 117 to validate the driver input by analyzing whether the vehicle direction, vibration, tilt, or the like is typical for the location.

At 330, the adaptation module 230 may increase the fixed time interval 260 value in the data store 240 by one or more time units since the driver input satisfied the criteria 270. The testing system 170 may determine that the driver input is valid by satisfying parameters of the criteria 270 according to the driver maneuver, behavior, location, the map data 116, the sensor data 250, or the like. For example, the testing system 170 may determine a driver input is valid when vehicle 100 maintains a center position, by staying within a certain distance from side lane markers of a driving lane using the sensor data 250, that satisfies parameters of the criteria 270.

At 340, the adaptation module 230 may decrease by one or more time units or initialize the fixed time interval 260 value in the data store 240 when the driver input does not satisfy parameters of the criteria 270. When the testing system 170 determines that driver alertness, awareness, interaction, or the like is minimal, the testing system 170 may initialize the fixed time interval 260 by resetting to a default value or zero. For example, the testing system 170 may determine that jerky or erratic movement by the vehicle 100 is beyond a predetermined threshold level and unsafe. The testing system 170 may use this assessment and observation to determine that the driver is inattentive, distracted, drowsy, or the like and the driver input(s) is invalid and initialize the fixed time interval 260. Thus, the testing system 170 may improve safety by initializing the fixed time interval 260 in the event of dangerous driving conditions in manual driving mode.

At 350, the automated driving module(s) 160 may apply the increased, decreased, or initialized fixed time interval 260 by changing the stored value in the data store 240 for ADS modes to use to monitor driver interaction or participation. For example, the vehicle 100 may more or less frequently demand driver feedback before disengaging or triggering a warning according to the adapted fixed time interval 260 to maintain proper driver engagement or interaction during automated driving. A warning may be an alarm, a displayed prompt, haptic feedback, or the like. In one approach, the testing system 170 may also use the increased or decreased fixed time interval 260 to determine a time for the next test. Further testing by the testing system 170 may improve automated driving by adapting the fixed time interval 260 for different driving environments.

Figure 4:
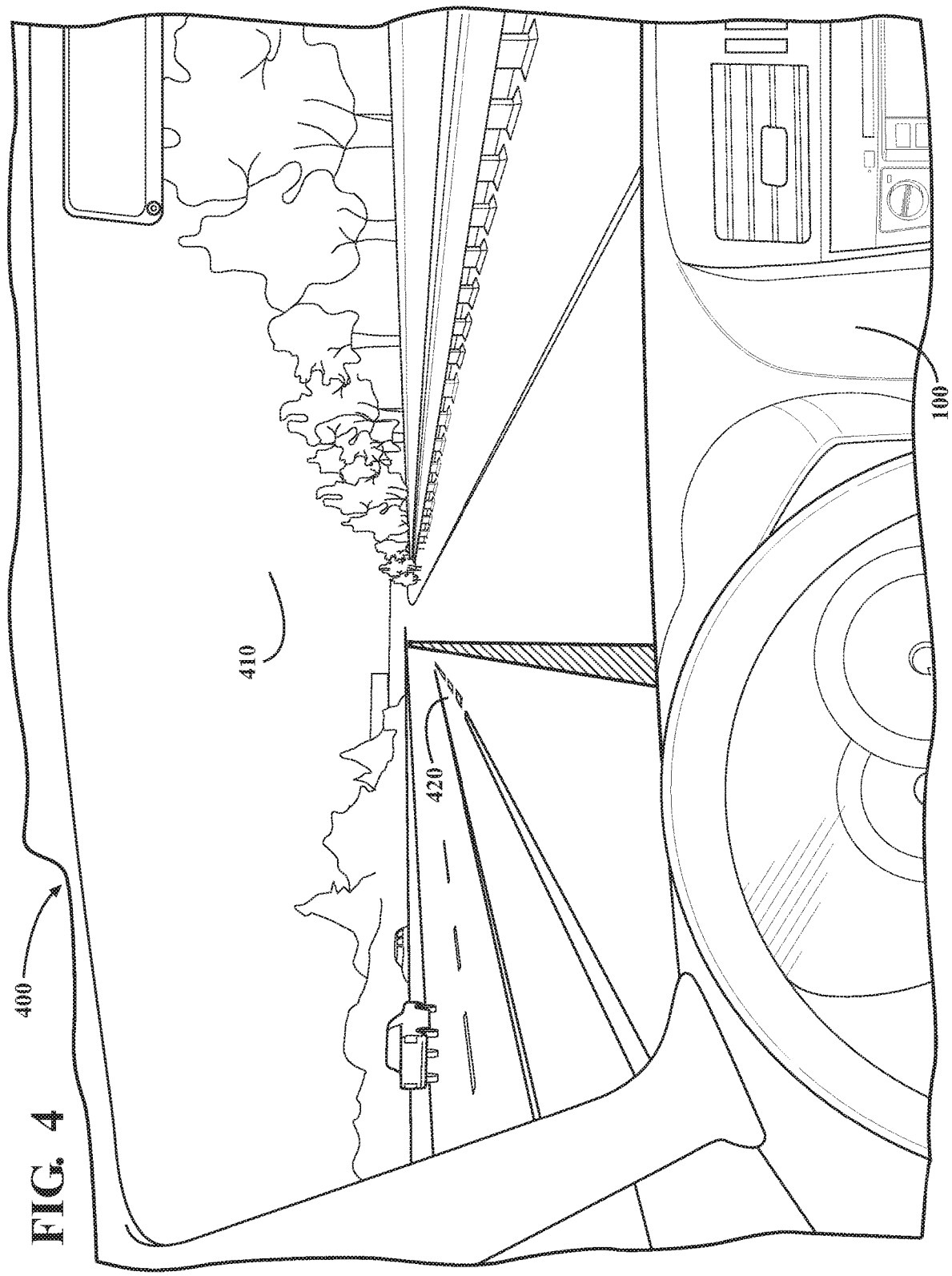
FIG. 4 is a diagram that illustrates a driving environment that tests for valid driver inputs to adapt a fixed time interval on the road with other vehicles.

FIG. 4 is a diagram illustrating a driving environment 400 that tests for valid driver inputs to adapt a fixed time interval on the road with other vehicles. In FIG. 4, the testing system 170 may test for driver inputs during manual driving in an expressway driving. The driving environment 410 may include the vehicle 100 traveling on the expressway 420. If driving environment 410 meets a safety standard of the vehicle 100, the testing system 170 may test a driving input while traveling on the expressway 420 to determine if the fixed time interval 260 should be adjusted. In this approach, other vehicles on the expressway 420 may result in a decrease of the fixed time interval 260 to demand more driver attention for automated driving. The testing system 170 decreasing the fixed time interval 260 may result in more frequent driver feedback during automated driving for safety.

Figure 5:
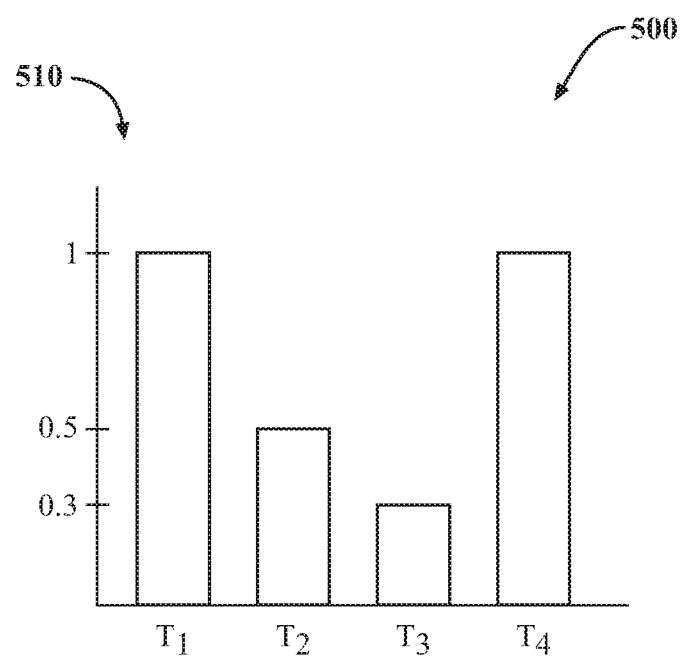
FIG. 5 is a diagram that illustrates testing for valid driver inputs to adapt the fixed time interval over time.

In addition, FIG. 5 is a diagram that illustrates testing for valid driver inputs to adapt the fixed time interval 260 over time 500. The testing system 170 may conduct a test 510 over time during a manual driving mode. The testing system 170 at time $T_1$ may adjust the fixed time interval 260 to a full value of 1 according to a driver input satisfying parameters of the criteria 270. For example, the testing system 170 may determine using the sensor data 250 that a driver input satisfies the criteria 270 parameters when vehicle 100 maintains a center position by staying within a certain distance from side lane markers of a driving lane. Subsequent to automated driving, the testing system 170 may conduct a test at time $T_2$ and adjust the fixed time interval 260 to a reduced value 0.5 according to a driver input not satisfying the criteria 270. For example, the testing system 170 may determine a driver input does not satisfy the criteria 270 when the vehicle 100 is unstable by comparing an offset between a potential path obtained from navigation system 147 to the current path. The testing system 170 decreasing the value to 0.5 may indicate the need for more frequent driver feedback during certain ADS modes. The testing system 170 may also use the decreased value of the fixed time interval 260 for more frequent testing. After the testing system 170 conducts tests at times $T_3$ and $T_4$, the fixed time interval 260 may recover to a full value of 1 according to a driver input not satisfying the criteria 270 and a driver input satisfying the criteria 270, respectfully. A full value of 1 for the fixed time interval 260 may indicate that the driver is sufficiently attentive, aware, engaged, or the like for proper operation of certain ADS modes.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in only a subset of possible modes.

In one or more embodiments, the vehicle 100 is an automated or autonomous vehicle. As an automated vehicle, the vehicle 100 may be configured to use an ADS to perform autonomous functions through the automated driving module(s) 160. As used herein, "autonomous vehicle" refers to a vehicle that is capable of operating in an autonomous, automated, or ADS mode (e.g., category 5, full automation). "Autonomous mode" or ADS mode refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain map(s) 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle map(s) 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

The sensor data 119 includes at least the vehicle control inputs. The vehicle control inputs comprise, in one example, steering inputs (e.g., steering wheel angle, rate and direction of rotation, etc.), braking inputs (e.g., the extent of brake pedal activation/pressure), and acceleration inputs (e.g., the extent of accelerator pedal activation/pressure). In further aspects, the vehicle control inputs also specify transmission control inputs (e.g., gear selection), drive mode (e.g., 2-wheel drive, 4-wheel drive, etc.), engine/motor parameters (e.g., engine RPM, driving mode for hybrid vehicles, etc.), and so on. In yet further aspects, the sensor data 119 includes current dynamics data such as angular velocity, g-forces (e.g., longitudinal, lateral, etc.), speed profile, wheel speeds, activation controls (e.g., anti-lock brake system (ABS) activation, traction control activation, stability control activation, etc.), and so on.

In some instances, at least a portion of the map data 116 and/or the sensor data 119 can be located in one or more data stores 115 located on-board the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect a position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), GPS, a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of each of the following: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo or infrared (IR) cameras.

The vehicle 100 can include an input system 130. An "input system" includes components or arrangements or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geo-location system.

The processor(s) 110 and/or the automated driving module(s) 160 can be operatively connected to communicate with the various vehicle systems 140 and/or individual components thereof. For example, the processor(s) 110 and/or the automated driving module(s) 160 can be in communication to send and/or receive information from the various vehicle systems 140 to control the movement of the vehicle 100. The processor(s) 110 and/or the automated driving module(s) 160 may control some or all of the vehicle systems 140 and, thus, may be partially or fully autonomous as defined by the Society of Automotive Engineers (SAE) 0 to 5 levels.

As another example, the processor(s) 110 and/or the automated driving module(s) 160 can be operatively connected to communicate with the various vehicle systems 140 and/or individual components thereof. For example, the processor(s) 110 and/or the automated driving module(s) 160 can be in communication to send and/or receive information from the various vehicle systems 140 to control the movement of the vehicle 100. The processor(s) 110 and/or the automated driving module(s) 160 may control some or all of the vehicle systems 140.

The processor(s) 110 and/or the automated driving module(s) 160 may be operable to control the navigation and maneuvering of the vehicle 100 by controlling one or more of the vehicle systems 140 and/or components thereof. For instance, when operating in an automated or autonomous mode, the processor(s) 110, and/or the automated driving module(s) 160 can control the direction and/or speed of the vehicle 100. The processor(s) 110 and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components responsive to receiving signals or other inputs from the processor(s) 110 and/or the automated driving module(s) 160. For instance, the one or more actuators 150 can include motors, pneumatic actuators, hydraulic pistons, relays, solenoids, piezoelectric actuators, or the like.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by the one or more processor(s) 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine the position and velocity of the vehicle 100. The automated driving module(s) 160 can determine the location of obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250 as implemented by an occupancy module. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, reversing, or the like. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), ROM, an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A testing system for improving automated driving, comprising:
  a processor;
  a memory communicably coupled to the processor and storing:
    a testing module including instructions that, when executed by the processor, cause the processor to:
      test, using a motion sensor of a vehicle that senses first driver feedback, an input from a driver during a manual driving mode of the vehicle;
    an adaptation module including instructions that when executed by the processor cause the processor to:
      adapt, using a controller during the manual driving mode, a fixed time interval on a condition that a test result of the input satisfies criteria that validate driver inputs and the input maintains the vehicle within a lateral distance from a lane marker of a driving lane that satisfies the criteria; and
      adjust, using the controller, the criteria according to the driver inputs when validated in association with testing for the fixed time interval, wherein the fixed time interval comprises a period that triggers a warning upon expiration; and
    an automated driving system module including instructions that when executed by the processor cause the processor to:
      monitor, by an input system using an actuator of the vehicle, steering feedback according to the fixed time interval during an autonomous driving mode for driver participation and execute tests periodically to validate second driver feedback according to the fixed time interval, wherein the instructions to adapt the fixed time interval further include to decrease the fixed time interval subsequent to the autonomous driving mode associated with offsets between a current path and a recommended path of the vehicle that do not satisfy the criteria.

2. The testing system of claim 1, wherein the testing module further includes instructions to test the steering feedback to increase the fixed time interval on a condition that the steering feedback satisfies the criteria, wherein the driver maneuvers the vehicle with limited assistance from the vehicle during the manual driving mode and the vehicle performs maneuvering actively during the autonomous driving mode.

3. The testing system of claim 1 further comprising a determination module including instructions that when executed by the processor cause the processor to:
 determine that the criteria are satisfied by identifying whether the vehicle is maintaining a center position of the driving lane on the current path using handling or braking information for the criteria and to determine that the input is valid according to the identification; and
 set the fixed time interval to a full value when sustaining the current path.

4. The testing system of claim 1 further comprising a determination module including instructions that when executed by the processor cause the processor to determine that the criteria are satisfied including instructions to identify whether the vehicle is traveling in an unstable trajectory and to determine that the input is invalid according to the identification.

5. The testing system of claim 1 further comprising a determination module including instructions that when executed by the processor cause the processor to determine that the criteria are satisfied including instructions to identify whether the vehicle is maintaining a speed or a stable distance with a front vehicle and to determine that the input is valid according to the identification.

6. The testing system of claim 1, wherein the adaptation module further includes instructions to decrease or initialize the fixed time interval on a condition that the test result indicates that the input is invalid and associated with an erroneous maneuver from the lane marker.

7. The testing system of claim 6, wherein the driver participation increases with the decrease of the fixed time interval.

8. The testing system of claim 1 further comprising a determination module including instructions that when executed by the processor cause the processor to determine that the criteria are satisfied by identifying whether a driver maneuver meets a speed threshold and to determine that the input is valid according to the identification.

9. A non-transitory computer-readable medium for improving automated driving including instructions that, when executed by a processor, cause the processor to:
 test, using a motion sensor of a vehicle that senses first driver feedback, an input from a driver during a manual driving mode of the vehicle;
 adapt, during the manual driving mode, a fixed time interval on a condition that a test result of the input satisfies criteria that validate driver inputs and the input maintains the vehicle within a lateral distance from a lane marker of a driving lane that satisfies the criteria;
 adjust the criteria according to the driver inputs when validated in association with testing for the fixed time interval, wherein the fixed time interval comprises a period that triggers a warning upon expiration; and monitor, by an input system using an actuator of the vehicle, steering feedback according to the fixed time interval during an autonomous driving mode for driver participation and execute tests periodically to validate second driver feedback according to the fixed time interval, wherein the instructions to adapt the fixed time interval further include to decrease the fixed time interval subsequent to the autonomous driving mode associated with offsets between a current path and a recommended path of the vehicle that do not satisfy the criteria.

10. The non-transitory computer-readable medium of claim 9, wherein the instructions to test the input from the driver further include instructions to test the steering feedback to increase the fixed time interval on a condition that the steering feedback satisfies the criteria, wherein the driver maneuvers the vehicle with limited assistance from the vehicle during the manual driving mode and the vehicle performs maneuvering actively during the autonomous driving mode.

11. The non-transitory computer-readable medium of claim 9, wherein the instructions to adapt the fixed time interval further includes instructions to decrease or initialize the fixed time interval on a condition that the test result indicates that the input is invalid and associated with an erroneous maneuver.

12. The non-transitory computer-readable medium of claim 9, wherein the instructions further include instructions that when executed by the processor cause the processor to determine that the criteria are satisfied by identifying whether the vehicle is maintaining a center position of the driving lane on the current path using handling or braking information for the criteria and to determine that the input is valid according to the identification; and set the fixed time interval to a full value when sustaining the current path.

13. A method, comprising:
 testing, using a motion sensor of a vehicle that senses first driver feedback, an input from a driver during a manual driving mode of the vehicle;
 adapting, during the manual driving mode, a fixed time interval on a condition that a test result of the input satisfies criteria that validate driver inputs and the input maintains the vehicle within a lateral distance from a lane marker of a driving lane that satisfies the criteria;
 adjusting the criteria according to the driver inputs when validated in association with testing for the fixed time interval, wherein the fixed time interval comprises a period that triggers a warning upon expiration; and
 monitoring, via an input system using an actuator of the vehicle, steering feedback according to the fixed time interval during an autonomous driving mode for driver participation and executing tests periodically to validate second driver feedback according to the fixed time interval, wherein the instructions to adapt the fixed time interval further include to decrease the fixed time interval subsequent to the autonomous driving mode associated with offsets between a current path and a recommended path of the vehicle that do not satisfy the criteria.

14. The method of claim 13, wherein testing further comprises testing the steering feedback to increase the fixed time interval on a condition that a test result of the steering feedback satisfies the criteria, wherein the driver maneuvers the vehicle with limited assistance from the vehicle during the manual driving mode and the vehicle performs maneuvering actively during the autonomous driving mode.

15. The method of claim 13 further comprising:
determining that the criteria are satisfied by identifying whether the vehicle is maintaining a center position of the driving lane on the current path using handling or braking information for the criteria and determining that the input is valid according to the identification; and setting the fixed time interval to a full value when sustaining the current path.

16. The method of claim 13 further comprising determining that the criteria are satisfied by identifying whether the vehicle is traveling in an unstable trajectory and determining that the input is invalid according to the identification.

17. The method of claim 13 further comprising determining that the criteria are satisfied by identifying whether the vehicle is maintaining a speed or a stable distance with a front vehicle and determining that the input is valid according to the identification.

18. The method of claim 13, wherein adapting further includes decreasing or initializing the fixed time interval on a condition that the test result indicates that the input is invalid and associated with an erroneous maneuver from the lane marker.

19. The method of claim 18, wherein the driver participation increases with the decrease of the fixed time interval.

20. The method of claim 13 further comprising determining that the criteria are satisfied by identifying whether a driver maneuver meets a speed threshold and determining that the input is valid according to the identification.

* * * * *